United States Patent
Puyol et al.

(10) Patent No.: US 12,443,288 B2
(45) Date of Patent: Oct. 14, 2025

(54) CODE SCANNING VIA AUGMENTED REALITY DEVICE

(71) Applicant: Meta Platforms Technologies, LLC, Menlo Park, CA (US)

(72) Inventors: Ana Garcia Puyol, Mountain View, CA (US); Reggie Wirjadi, Union City, CA (US); Isaac Rose, Lafayette, CA (US); Andrew Mast, Seattle, WA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 0 days.

(21) Appl. No.: 18/496,454

(22) Filed: Oct. 27, 2023

(65) Prior Publication Data
US 2024/0143085 A1    May 2, 2024

Related U.S. Application Data

(60) Provisional application No. 63/381,515, filed on Oct. 28, 2022.

(51) Int. Cl.
| | | |
|---|---|---|
| G06F 3/01 | (2006.01) | |
| G06F 3/04815 | (2022.01) | |
| G06F 3/16 | (2006.01) | |
| G06K 7/14 | (2006.01) | |
| H04N 23/667 | (2023.01) | |

(52) U.S. Cl.
CPC ......... *G06F 3/017* (2013.01); *G06F 3/04815* (2013.01); *G06K 7/1417* (2013.01); *H04N 23/667* (2023.01); *G06F 3/167* (2013.01)

(58) Field of Classification Search
CPC ...... G06F 3/017; G06F 3/167; G06F 3/04815; G06F 3/011; G06F 3/013; G06F 3/012; G06F 3/0304; H04N 23/667; G06K 7/1417

See application file for complete search history.

(56) References Cited

U.S. PATENT DOCUMENTS

| | | |
|---|---|---|
| 9,946,963 B2 | 4/2018 | Samara et al. |
| 10,127,724 B2 | 11/2018 | Carre et al. |
| 10,810,797 B2 | 10/2020 | Urbach et al. |
| 11,150,482 B2 | 10/2021 | Mullins et al. |
| 11,347,054 B2 | 5/2022 | Woods et al. |

(Continued)

OTHER PUBLICATIONS

YouTube: "AR QR Codes: The Future of Interactive Advertising," Oct. 24, 2023, 7 pages, Retrieved from the internet URL: https://www.youtube.com/watch?v=CzEkM0dS5GM.

*Primary Examiner* — Muhammad N Edun
(74) *Attorney, Agent, or Firm* — Morgan, Lewis & Bockius LLP

(57) ABSTRACT

A method and system for virtual object interactions based on code scanning. The method includes scanning, at a first device, a code (e.g., quick response (QR) code) printed on an object in a physical reality within a field of view (FOV) of a user. The method also includes accessing a network site associated with the object based on the code. The method also includes generating virtual content including at least one virtual object based on the network site. The method also includes displaying the virtual content in the first device. The method also includes navigating the virtual content in response to a gesture from the user.

20 Claims, 12 Drawing Sheets

(56) References Cited

U.S. PATENT DOCUMENTS

| | | | | |
|---|---|---|---|---|
| 2014/0376773 A1* | 12/2014 | Holz | ..................... | G06F 3/0304 |
| | | | | 382/103 |
| 2019/0362556 A1* | 11/2019 | Ben-Dor | ................. | G06F 3/167 |
| 2022/0027592 A1* | 1/2022 | Ringuette | ............. | H04L 9/3213 |
| 2022/0057636 A1* | 2/2022 | Hashimoto | ........... | G06F 3/0304 |

* cited by examiner

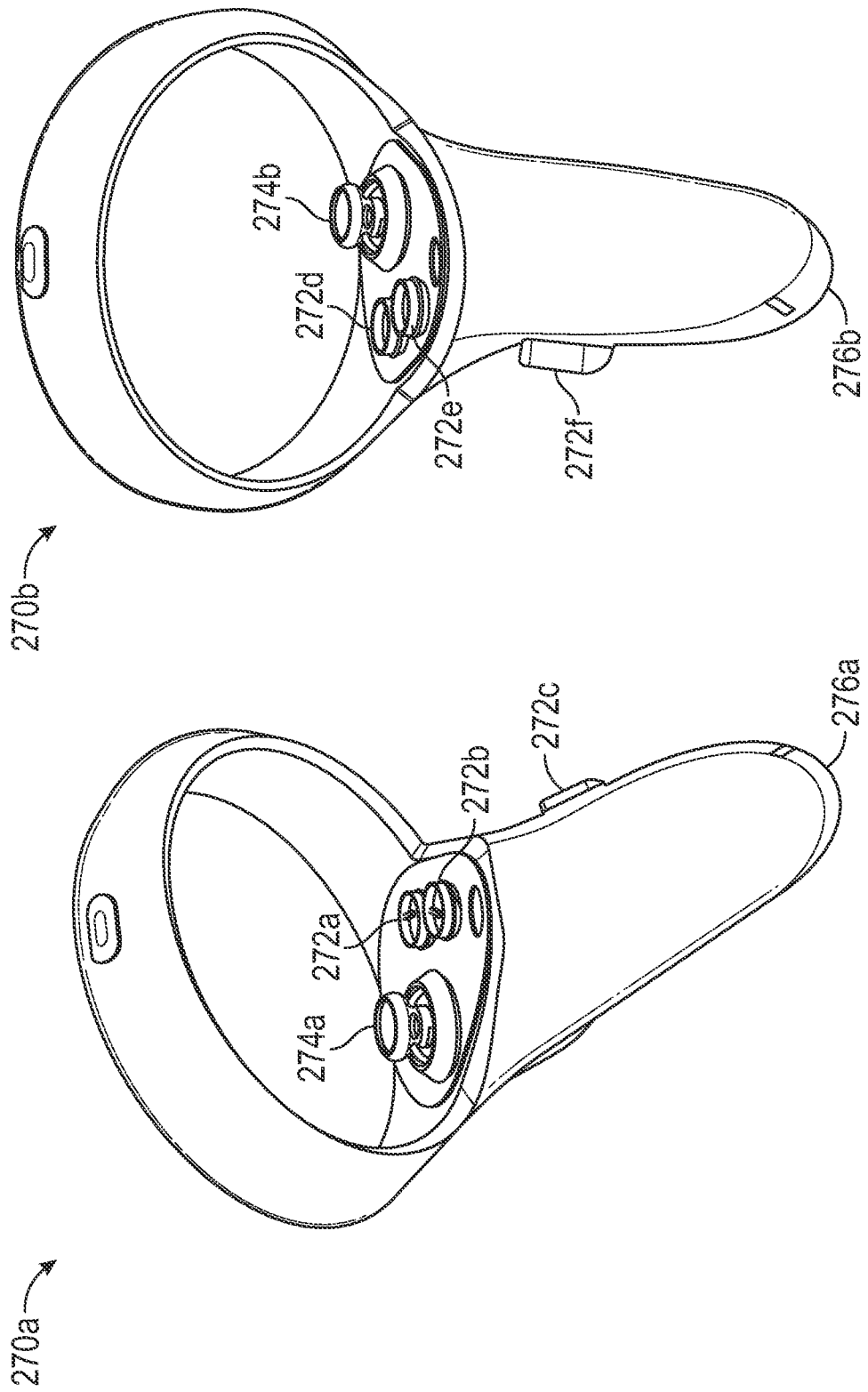

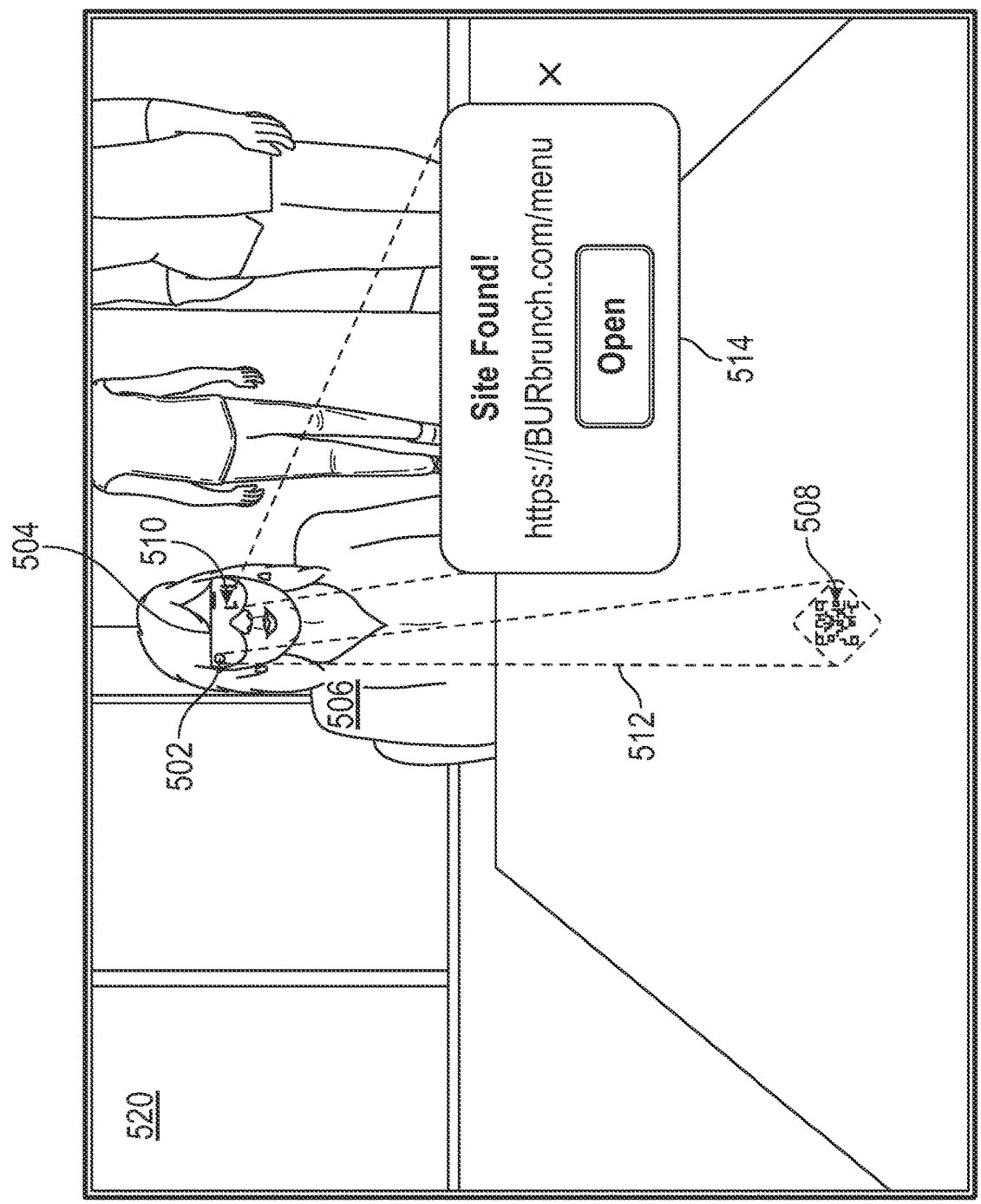

CODE SCANNING VIA AUGMENTED REALITY DEVICE

BACKGROUND

Field

The present disclosure relates generally to augmented reality (AR), and similarly virtual reality and mixed reality (VR/MR), applications and devices thereof. More specifically, the present disclosure relates to scanning a code (e.g., a quick-response code) printed within the field of view of an AR device and enabling user interactions with the resources linked by the code.

Related Art

Conventionally, artificial reality, extended reality, or extra reality (collectively "XR") is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may be associated with applications, products, accessories, services, or some combination thereof, that are, e.g., used to create or interact with content in an AR environment.

SUMMARY

The subject disclosure provides for systems and methods for scanning codes and enabling virtual object interactions in AR applications based on the codes. Users can have a 3D visualization of the objects and interact with the them through the AR applications.

One aspect of the present disclosure relates to a method for code scanning and object interactions via AR. The method may include scanning, at a first device, a quick-response (QR) code printed on an object in a physical reality within a field of view (FOV) of a user; accessing a network site associated with the object based on the QR code; generating virtual content including at least one virtual object based on the network site; displaying the virtual content in the first device; and navigating the virtual content in response to a gesture from the user.

Another aspect of the present disclosure relates to a system configured for code scanning and object interactions via AR. The system may include one or more hardware processors configured by machine-readable instructions. The processor(s) may be configured to scan, at a camera included in a headset, a quick-response (QR) code printed on an object in a physical reality within a field of view (FOV) of a user wearing the headset; access a network site associated with the object based on the QR code; generate virtual content including at least one virtual object based on the network site; display the virtual content to the user via the headset; and navigate the virtual content in response to a gesture from the user.

Yet another aspect of the present disclosure relates to a non-transient computer-readable storage medium having instructions embodied thereon, the instructions being executable by one or more processors to perform a method for code scanning and object interactions via AR. The method may include scanning, at a camera in a first device, a quick-response (QR) code printed on an object in a physical reality within a field of view (FOV) of a user; accessing a network site associated with the object based on the QR code; retrieving at least one virtual object from the network site; generating virtual content including the at least one virtual object; displaying the virtual content in the first device; and navigating the virtual content in response to a gesture from the user.

Still another aspect of the present disclosure relates to a system configured for scanning codes and enabling virtual object interactions in AR applications based on the codes. The system may include means for capturing, at a first device, a quick-response (QR) code printed on an object in a physical reality within a field of view (FOV) of a user; scanning the QR code; accessing a network site associated with the object based on the QR code; generating virtual content including at least one virtual object based on the network site; displaying the virtual content in the first device; and navigating the virtual content in response to a gesture from the user.

BRIEF DESCRIPTION OF THE DRAWINGS

To easily identify the discussion of any particular element or act, the most significant digit or digits in a reference number refer to the figure number in which that element is first introduced.

FIG. 2C illustrates controllers that a user can hold in one or both hands to interact with an artificial reality environment presented by the HMDs of FIGS. 2A and 2B, in accordance with one or more implementations.

FIGS. 5A and 5B illustrate mixed reality views wherein 3D objects are imported into an immersed reality application upon reading a code in the field of view of a user, in accordance with one or more implementations.

Figure 1:
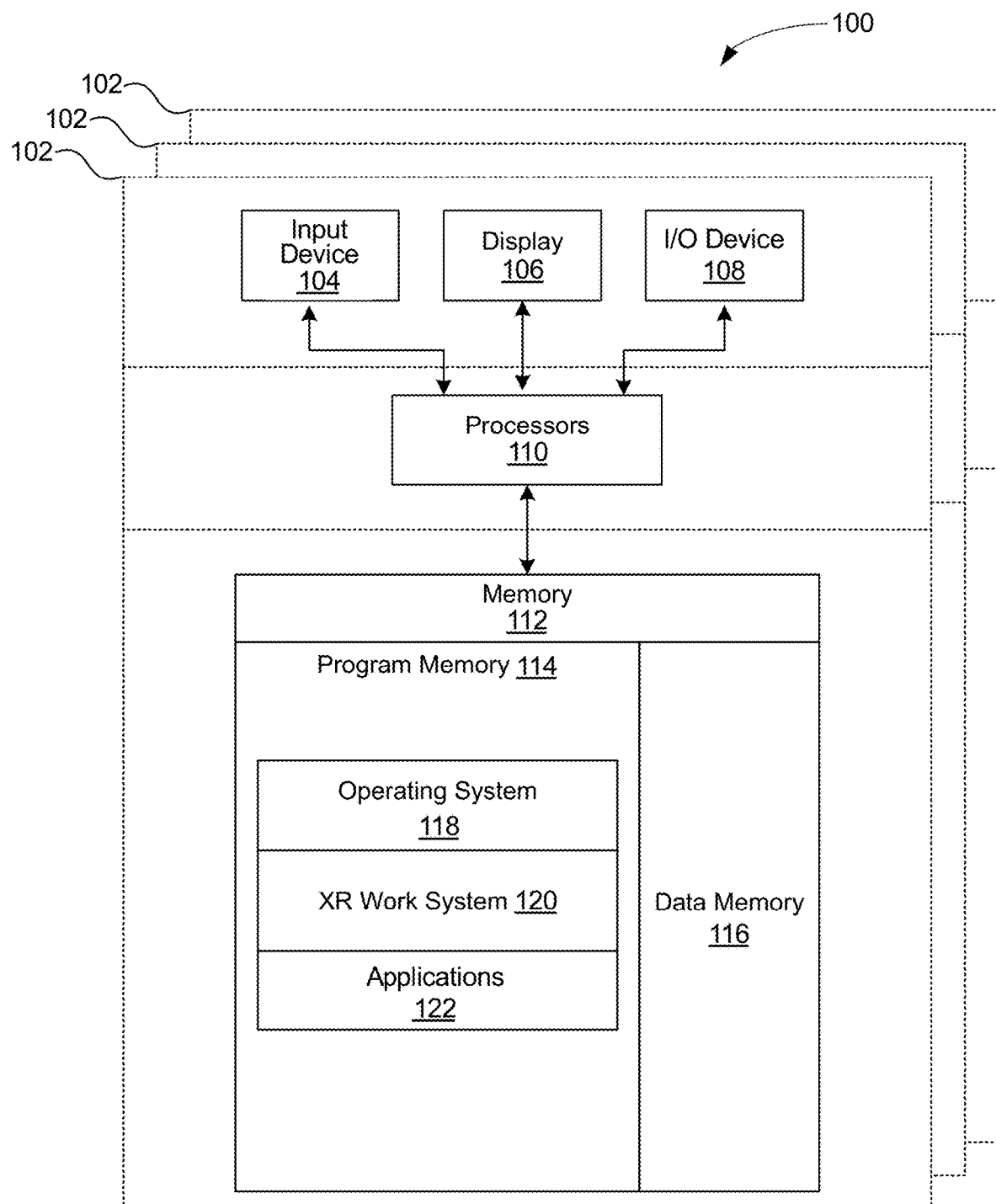
FIG. 1 is a block diagram illustrating an overview of devices on which some implementations of the disclosed technology can operate.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

Embodiments of the disclosed technology may include or be implemented in conjunction with an artificial reality system and code scanning. Artificial reality, extended reality, or extra reality (collectively "XR") is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may be associated with applications, products, accessories, services, or some combination thereof, that are, e.g., used to interact with content in an immersive application. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real-world after they have passed through a computing system. For example, a tablet with a camera on the back can capture images of the real-world and then display the images on the screen on the opposite side of the tablet from the camera. The tablet can process and adjust or "augment" the images as they pass through the system, such as by adding virtual objects. AR also refers to systems where light entering a user's eye is partially generated by a computing system and partially composes light reflected off objects in the real-world. For example, an AR headset could be shaped as a pair of glasses with a pass-through display, which allows light from the real-world to pass through a waveguide that simultaneously emits light from a projector in the AR headset, allowing the AR headset to present virtual objects intermixed with the real objects the user can see. The AR headset may be a block-light headset with video pass-through. "Artificial reality," "extra reality," or "XR," as used herein, refers to any of VR, AR, MR, or any combination or hybrid thereof.

Quick-response (QR) codes are widely used in mobile applications for accessing information. However, these approaches include the loading of a dedicated application in the mobile device for scanning QR codes. The QR code may redirect a user to a link, Uniform Resource Locator (URL) for a website, or the like. In addition, the information accessed via the QR code is often times passive, and certainly not suitable for embedding into an immersive application where objects can be displayed as three-dimensional (3D) models.

Embodiments as disclosed herein provide a solution to the above problem by AR technology to enhance the user experience when using QR codes. According to embodiments, an AR device, such as a headset or smart glass, may be configured to identify and read a QR code labeled on objects in the field of view of the user (in the real world) and bring forth network resources and information associated with the objects to an immersive application. Upon scanning, the AR device may display a 3D object linked in the QR code in an immersive application where the user may manipulate/inspect the object, interact with various objects or features, make decisions, and select/discard objects.

In some embodiments, scanning the QR code may display a link in AR which the user may choose to redirect to. In some embodiments, scanning the QR code may display an interactive item such as, but not limited to, a menu, questionnaire, or the like. In some embodiments, upon confirmation of a selection of the link, the user may be directed to the interactive items.

In some embodiments, the user may have additional wearable devices, such as wristbands and/or rings including haptic sensors and controllers. Accordingly, the AR device may be configured to receive inputs from the additional wearable devices and identify, for example, hand gestures for activating a camera of the AR device and automatically scanning a QR code in the user's field of view (FOV). In some implementations, the inputs from the additional wearable devices may be used to manipulate objects loaded via the QR code in the immersive application. In some embodiments, the hand gestures identified by the wristband sensors may be used for navigating through a network site accessed through the QR code.

Embodiments, as disclosed herein, provide a solution to the above-mentioned problems rooted in computer technology, namely, enhancing code scanning and implementing display in an immersive application environment by leveraging XR technology. This improved the overall user experience when interacting with sites or information linked in scanning codes such as QR codes.

Example Architecture

Several implementations are discussed below in more detail in reference to the figures. FIG. 1 is a block diagram of a device operating environment 100 with which aspects of the subject technology can be implemented. The device operating environment can comprise hardware components of a computing system 100 that can create, administer, and provide interaction modes for a shared artificial reality environment (e.g., gaming artificial reality environment) such as for individually control of audio (e.g., switching audio sources) via XR elements and/or real world audio elements. The interaction modes can include different audio sources or channels for each user of the computing system 100. Some of these audio channels may be spatialized or non-spatialized. In various implementations, the computing system 100 can include a single computing device or multiple computing devices 102 that communicate over wired or wireless channels to distribute processing and share input data.

In some implementations, the computing system 100 can include a stand-alone headset capable of providing a computer created or augmented experience for a user without the need for external processing or sensors. In other implementations, the computing system 100 can include multiple computing devices 102 such as a headset and a core processing component (such as a console, mobile device, or server system) where some processing operations are performed on the headset and others are offloaded to the core processing component. Example headsets are described below in relation to FIGS. 2A-2B. In some implementations, position and environment data can be gathered only by sensors incorporated in the headset device, while in other implementations one or more of the non-headset computing devices 102 can include sensor components that can track environment or position data, such as for implementing computer vision functionality. Additionally, such sensors can be incorporated as wrist sensors, which can function as a wrist wearable for detecting or determining user input gestures. For example, the sensors may include inertial measurement units (IMUs), eye tracking sensors, electromyography (e.g., for translating neuromuscular signals to specific gestures), time of flight sensors, light/optical sensors, and/or the like to determine the inputs gestures, how user hands/wrists are moving, and/or environment and position data.

The computing system 100 can include one or more processor(s) 110 (e.g., central processing units (CPUs), graphical processing units (GPUs), holographic processing units (HPUs), etc.) The processors 110 can be a single processing unit or multiple processing units in a device or distributed across multiple devices (e.g., distributed across two or more of computing device 102). The computing system 100 can include one or more input devices 104 that provide input to the processors 110, notifying them of actions. The actions can be mediated by a hardware controller that interprets the signals received from the input device 104 and communicates the information to the processors 110 using a communication protocol. As an example, the hardware controller can translate signals from the input devices 104 to render audio, motion, or other signal-controlled features in the shared XR environment. Each input device 104 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, and/or other user input devices.

The processors 110 can be coupled to other hardware devices, for example, with the use of an internal or external bus, such as a PCI bus, SCSI bus, wireless connection, and/or the like. The processors 110 can communicate with a hardware controller for devices, such as for a display 106. The display 106 can be used to display text and graphics. In some implementations, the display 106 includes the input device as part of the display, such as when the input device is a touchscreen or is equipped with an eye direction monitoring system. In some implementations, the display is separate from the input device. Examples of display devices include an LCD display screen, an LED display screen, a projected, holographic, or augmented reality display (such as a heads-up display device or a head-mounted device), and/or the like. Other I/O devices 108 can also be coupled to the processor, such as a network chip or card, video chip or card, audio chip or card, USB, firewire or other external device, camera, printer, speakers, CD-ROM drive, DVD drive, disk drive, etc.

The computing system 100 can include a communication device capable of communicating wirelessly or wire-based with other local computing devices 102 or a network node. The communication device can communicate with another device or a server through a network using, for example, TCP/IP protocols. The computing system 100 can utilize the communication device to distribute operations across multiple network devices. For example, the communication device can function as a communication module. The communication device can be configured to transmit or receive audio signals.

The processors 110 can have access to a memory 112, which can be contained on one of the computing devices 102 of the computing system 100 or can be distributed across one of the multiple computing devices 102 of the computing system 100 or other external devices. A memory includes one or more hardware devices for volatile or non-volatile storage, and can include both read-only and writable memory. For example, a memory can include one or more of random-access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. The memory 112 can include program memory 114 that stores programs and software, such as an operating system 118, XR work system 120, and other application programs 122 (e.g., XR games). The memory 112 can also include data memory 116 that can include information to be provided to the program memory 114 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, and/or the like.

Figure 2A:
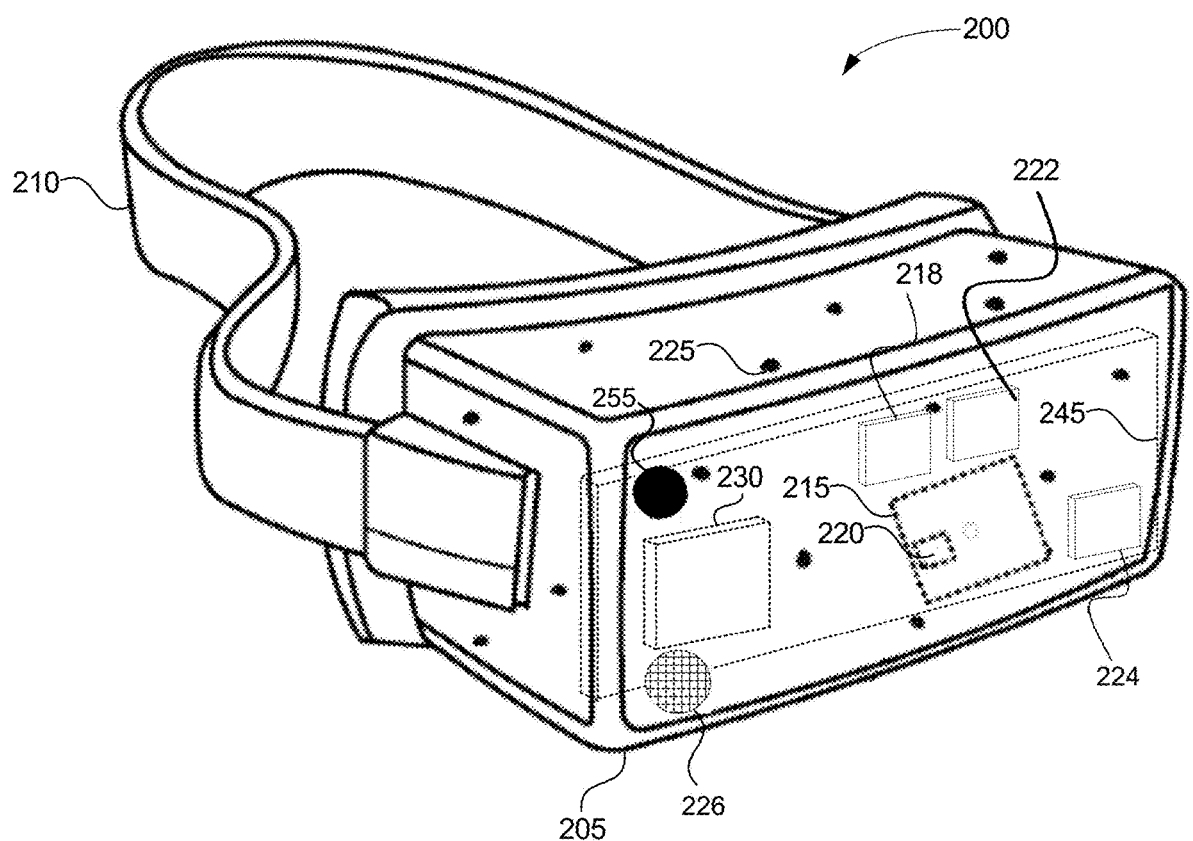
FIG. 2A is a wire diagram of a virtual reality head-mounted display (HMD), in accordance with one or more implementations.
Figure 2B:
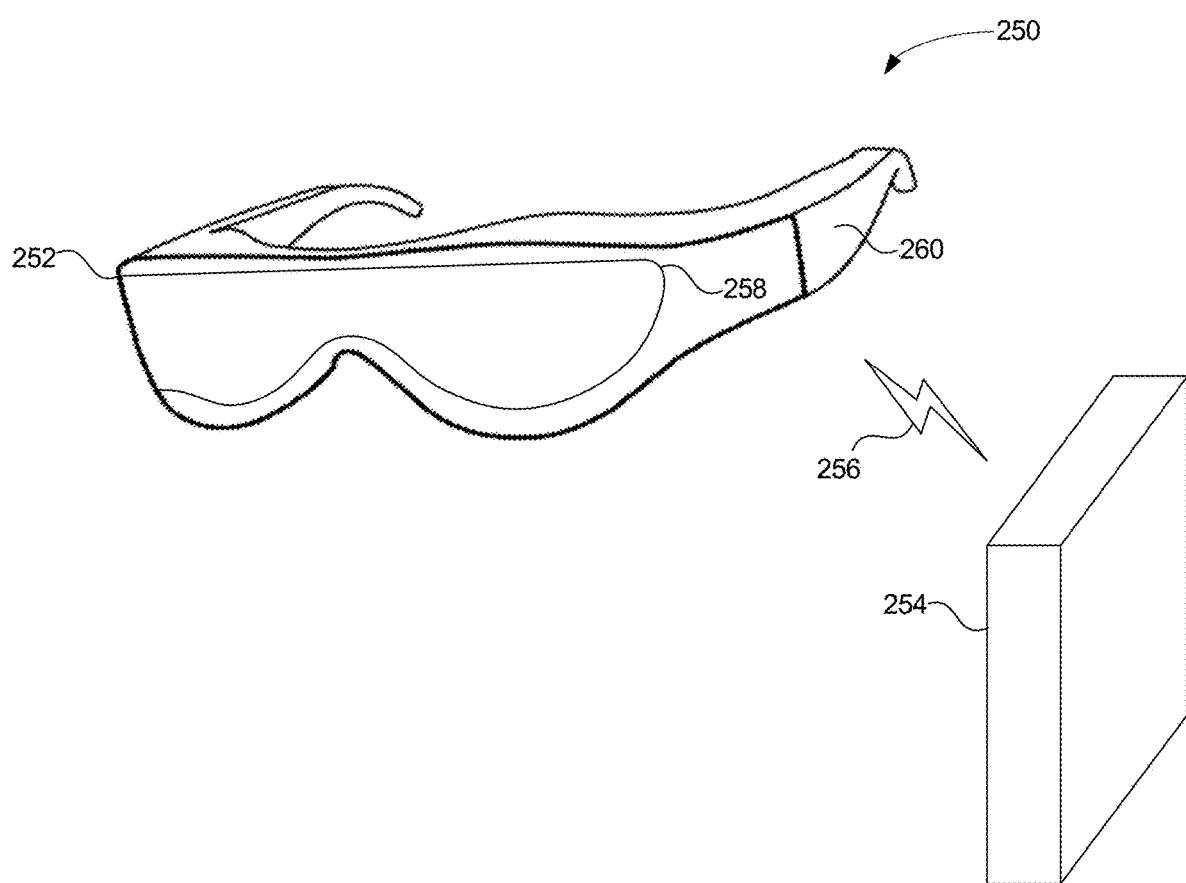
FIG. 2B is a wire diagram of a mixed reality system which includes a mixed reality smart glass and a core processing component, in accordance with one or more implementations.

FIGS. 2A-2B are diagrams illustrating virtual reality devices, according to certain aspects of the present disclosure. FIG. 2A is a diagram of a virtual reality head-mounted display (HMD) 200 (or headset). The HMD 200 includes a front rigid body 205 and a band 210. The front rigid body 205 includes one or more electronic display elements such as an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real-world and in a virtual environment in three degrees of freedom (3DoF), six degrees of freedom (6DoF), etc. For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points, such as for a computer vision algorithm or module. The compute units 230 in the HMD 200 can use the detected light points to extrapolate position and movement of the HMD 200 as well as to identify the shape and position of the real objects surrounding the HMD 200 (e.g., hand gestures performed by the user wearing the HMD 200).

The HMD 200 may include a memory circuit 218 storing instructions, and a processor circuit 222 configured to execute the instructions stored in a memory circuit 218 and cause the HMD 200 to perform at least partially, some of the operations in methods consistent with one or more embodiments. Furthermore, processor circuit 222 may provide images to electronic display 245 according to instructions stored in memory circuit 218. The images provided to electronic display 245 may be transmitted to a mobile device or remote server via communications module 224.

The HMD 200 may further include a camera 255 configured to capture images and/or video of a FOV for the user (e.g., QR code in the FOV of the user). The camera 255 may include a front view camera to provide a front FOV (fFOV) for the user, and a rear-view camera to collect a back FOV (bFOV) of the user. In some embodiments, rear view camera may collect a partial image (e.g., infra-red, and the like) of a portion of the user's face including the user's eye and pupil. Accordingly, bFOV may be used to determine a pupil location, a gaze direction, and an area of interest for the user, within electronic display 245. In some embodiments, camera 255 may be configured to capture a hand gesture by the user, and processor circuit 222 may execute instructions stored in memory circuit 218 to read and interpret the hand gesture from the user in terms of a desirability to switch a configuration of HMD 200 (e.g., between any of a VR mode, an AR mode or a MR mode). The HMD 200 may also include a speaker/microphone 226 to provide to, and receive audio from, the user and/or the environment.

The electronic display 245 provides an immersive reality environment for the user, including AR objects and real objects via a combination of see-through optics and a pixelated display. The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof. The electronic display 245 can be coupled with an audio component, such as send and receive output from various other users of the XR environment wearing their own XR headsets, for example. The audio component can be configured to host multiple audio channels, sources, or modes.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

FIG. 2B is a diagram of a mixed reality HMD system 250 which includes a smart glass 252 and a core processing component 254. The smart glass 252 and the core processing component 254 can communicate via a wireless connection (e.g., a 60 GHz link) as indicated by the link 256. In other implementations, the mixed reality HMD system 250 includes an smart glass only, without an external compute device or includes other wired or wireless connections between the smart glass 252 and the core processing component 254. The smart glass 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc. The frame 260 or another part of the smart glass 252 may include an audio electronic component such as a speaker. The speaker can output audio from various audio sources, such as a phone call, VoIP session, or other audio channel. The electronic components may be configured to implement audio switching based on user gaming or XR interactions.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to smart glass 252. Controllers in the smart glass 252 can convert the image data into light pulses from the projectors, which can be transmitted via the optical elements as output light to the user's eye. The output light can mix with light that passes through the display 258, allowing the output light to present virtual objects that appear as if they exist in the real-world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the smart glass 252 moves, and have virtual objects react to gestures and other real-world objects. For example, the HMD system 250 can track the motion and position of user's wrist movements as input gestures for performing XR navigation. As an example, the HMD system 250 may include a coordinate system to track the relative positions of various XR objects and elements in a shared artificial reality environment.

FIG. 2C illustrates controllers 270a-270b, which, in some implementations, a user can hold in one or both hands to interact with an artificial reality environment presented by the HMD 200 and/or HMD system 250. The controllers 270a-270b can be in communication with the HMDs, either directly or via an external device (e.g., core processing component 254). Embodiments are not limited to controllers and may comprise a wrist wearable device used to communication with the HMDs. The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. For example, the compute units 230 can use the monitored hand positions to implement navigation and scrolling via the hand positions and motions of the user, such as to enable a high fiving motion in XR.

The controllers 270a-270b can also include various buttons (e.g., buttons 272A-F) and/or joysticks (e.g., joysticks 274A-B), which a user can actuate to provide input and interact with objects. As discussed below, controllers 270a-270b can also have tips 276A and 276B, which, when in scribe controller mode, can be used as the tip of a writing implement in the artificial reality environment. In various implementations, the HMD 200 or 250 can also include additional subsystems, such as a hand tracking unit, an eye tracking unit, an audio system, various network components, etc. to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. Such camera-based hand tracking can be referred to as computer vision, for example. Sensing subsystems of the HMD 200 or 250 can be used to define motion (e.g., user hand/wrist motion) along an axis (e.g., three different axes).

Figure 3:
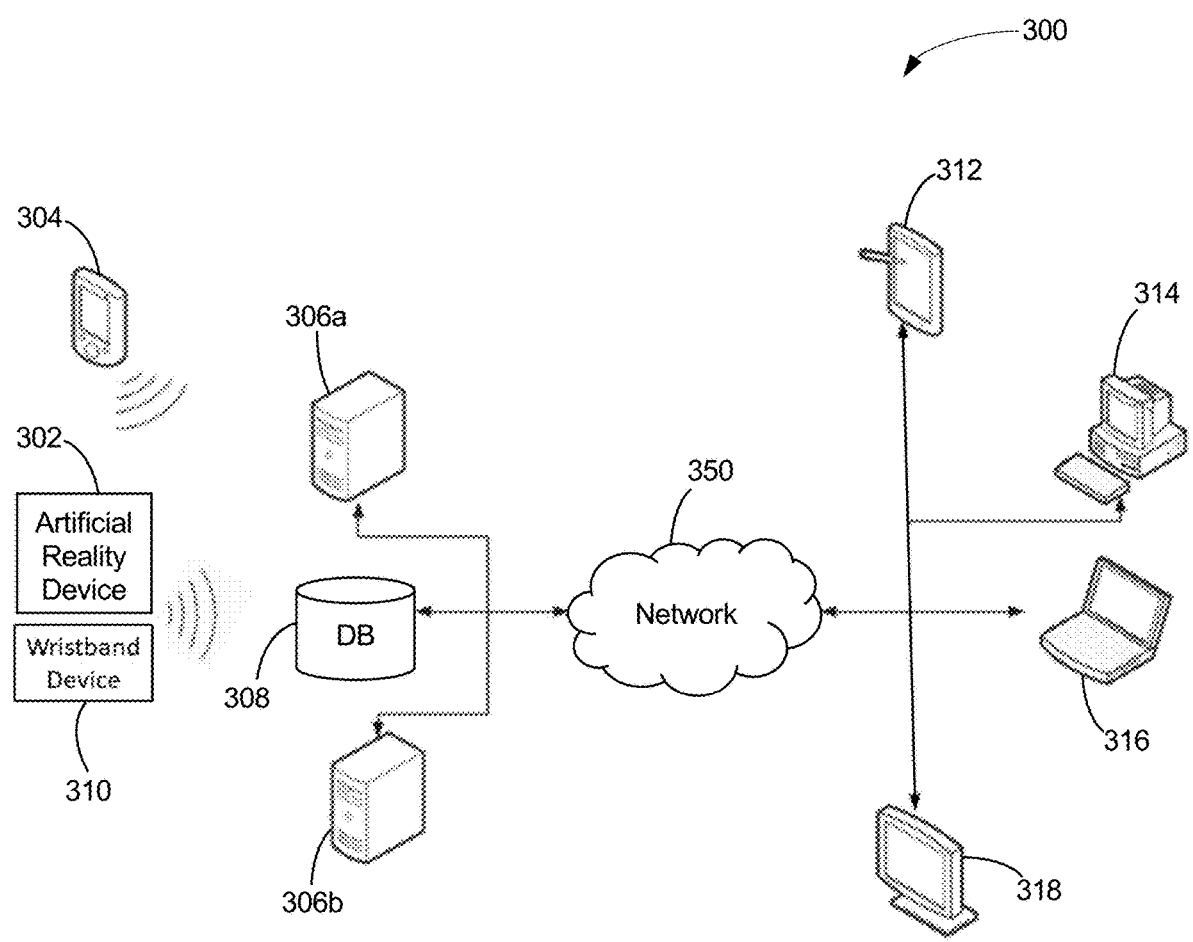
FIG. 3 is a block diagram illustrating an overview of an environment in which some implementations of the disclosed technology can operate.

FIG. 3 illustrating an overview of an environment 300 in which some implementations of the disclosed technology can operate. The environment 300 can include one or more client computing devices, such as headset 302, mobile device 304, wristband device 310, tablet 312, personal computer 314, laptop 316, desktop 318, and/or the like. The headset 302 may be one of HMD 200 or HMD system 250, or some other XR device that is compatible with rendering or interacting with an artificial reality or virtual reality environment. The headset 302 may include circuitry to communicatively couple with a mobile device 304. The wristband device 310 may be another wearable device such as a wrist wearable, a ring, or some other XR device that is compatible with rendering or interacting with an artificial reality or virtual reality environment. The headset 302, wristband device 310, and mobile device 304 may communicate wirelessly via the network 350. In some implementations, some of the client computing devices can be the HMD 200 or the HMD system 250. The client computing devices can operate in a networked environment using logical connections through network 350 to one or more remote computers, such as a server computing device.

In some implementations, the environment 300 may include a server such as an edge server which receives client requests and coordinates fulfillment of those requests through other servers. The server may include server computing devices 306a-306b, which may logically form a single server. Alternatively, the server computing devices 306a-306b may each be a distributed computing environment encompassing multiple computing devices located at the same or at geographically disparate physical locations. The client computing devices and server computing devices 306a-306b can each act as a server or client to other server/client device(s).

The server computing devices 306a-306b can connect to a database 308 or can comprise its own memory. Each server computing devices 306a-306b can correspond to a group of servers, and each of these servers can share a database or can have their own database. The database 308 may logically form a single unit or may be part of a distributed computing environment encompassing multiple computing devices that are located within their corresponding server, located at the same, or located at geographically disparate physical locations. Database 308 may include information associated with the immersive application running in the headset 302, such as 3D models and AR objects, web addresses and hyperlinks, and sensor data.

The network 350 can be a local area network (LAN), a wide area network (WAN), a mesh network, a hybrid network, or other wired or wireless networks. The network 350 may be the Internet or some other public or private network. Client computing devices can be connected to network 350 through a network interface, such as by wired or wireless communication. The connections can be any kind of local, wide area, wired, or wireless network, including the network 350 or a separate public or private network. In some implementations, the server computing devices 306a-306b can be used as part of a social network such as implemented via the network 350.

The wristband device 310 may correspond to the controllers 270a-270b, including a number of sensors and actuators such as motion sensors, electromagnetic sensors (e.g., electrodes, capacitors, solenoids, and the like), haptic sensors and actuators, pressure sensors, temperature sensors, accelerometers, gyroscopes, other inertial measurement units (IMUs), and the like. Accordingly, the wristband device 310 may be configured to detect a user gesture (e.g., a head node, or shake, a finger swipe or tap, finger clasping, pinching, sliding, or tapping, or the like) indicative of a user's intention in the immersive application. In some embodiments, a predetermined gesture detected by the wristband device 310 may activate a camera (e.g., camera 255) included in the headset 302 which may then be configured to automatically scan a FOV of the camera for a code. The detected user gesture may be transmitted from the wristband device 310 to the headset 302.

Additionally, the mobile device 304 (and/or the headset 302) may communicate with server computing devices 306a-306b via a network 150, via a communication module of the h. In some embodiments, the server computing devices 306a-306b may also communicate with, retrieve, and upload datasets onto a database 308. Communications module (e.g., communications module 224 of the HMD 200) may include circuitry, software, and firmware (e.g., radiofrequency hardware such as antennas, radios, digital circuit processing, digital to analog converters, analog to digital converters, phase locked loops, and the like) configured to enable the headset 302 to communicate wirelessly or otherwise with the wristband device 310, the mobile device 304, and the network 350. In some embodiments, the communications module may download images, video, audio, and other multimedia data (e.g., 3D objects) from the server computing devices 306a-306b, via network 350. Accordingly, in an AR configuration, a processor (e.g., processor circuit 222) may provide synthetic images, computer-generated images, interactive models/objects to s (e.g., electronic display 245).

The subject disclosure provides for systems and methods for scanning codes and enabling virtual object interactions in AR applications based on the codes.

Figure 4A:
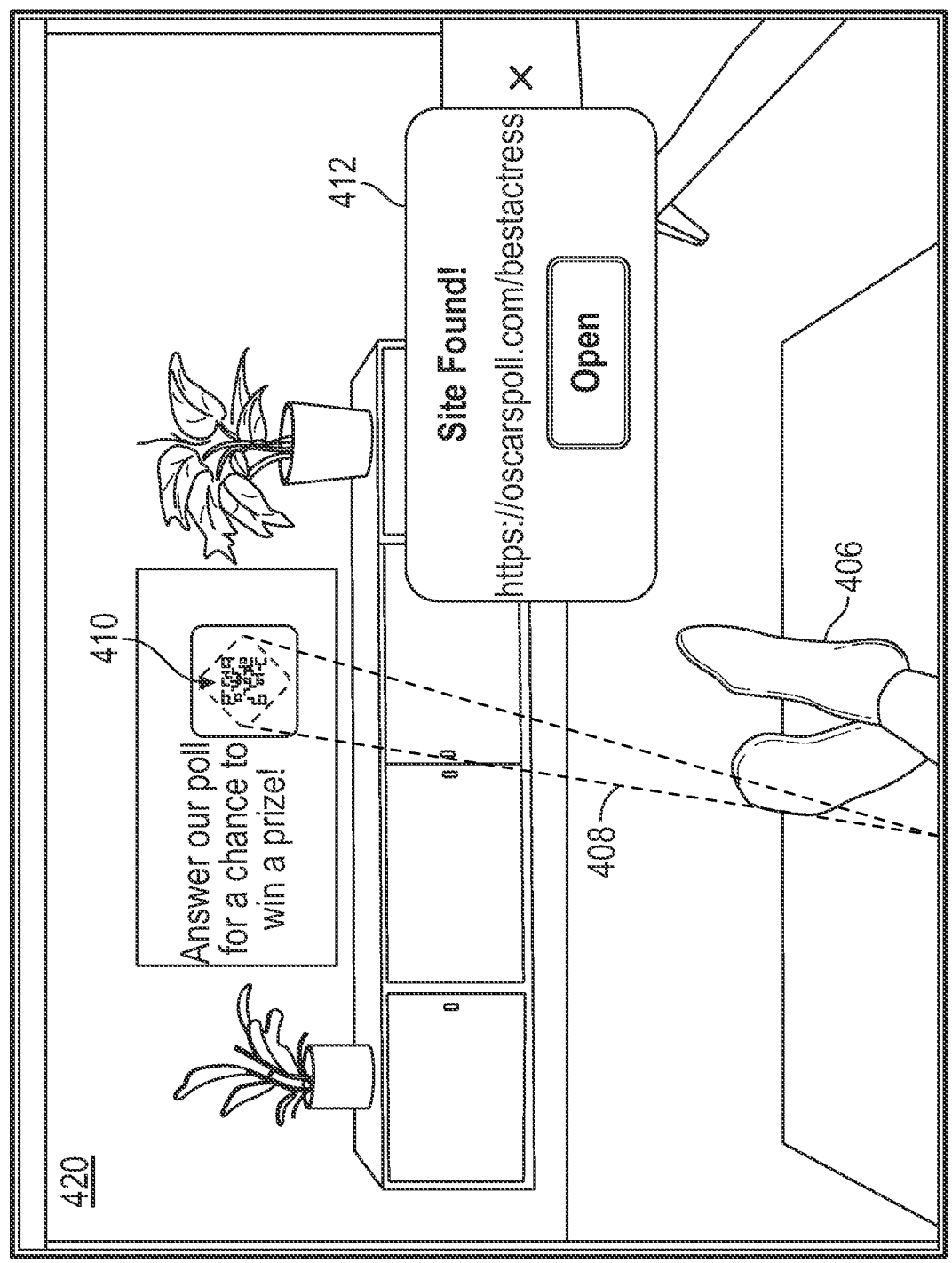
FIGS. 4A and 4B illustrate views of a display of a headset running a mixed reality application, in accordance with one or more implementations.
Figure 4B:
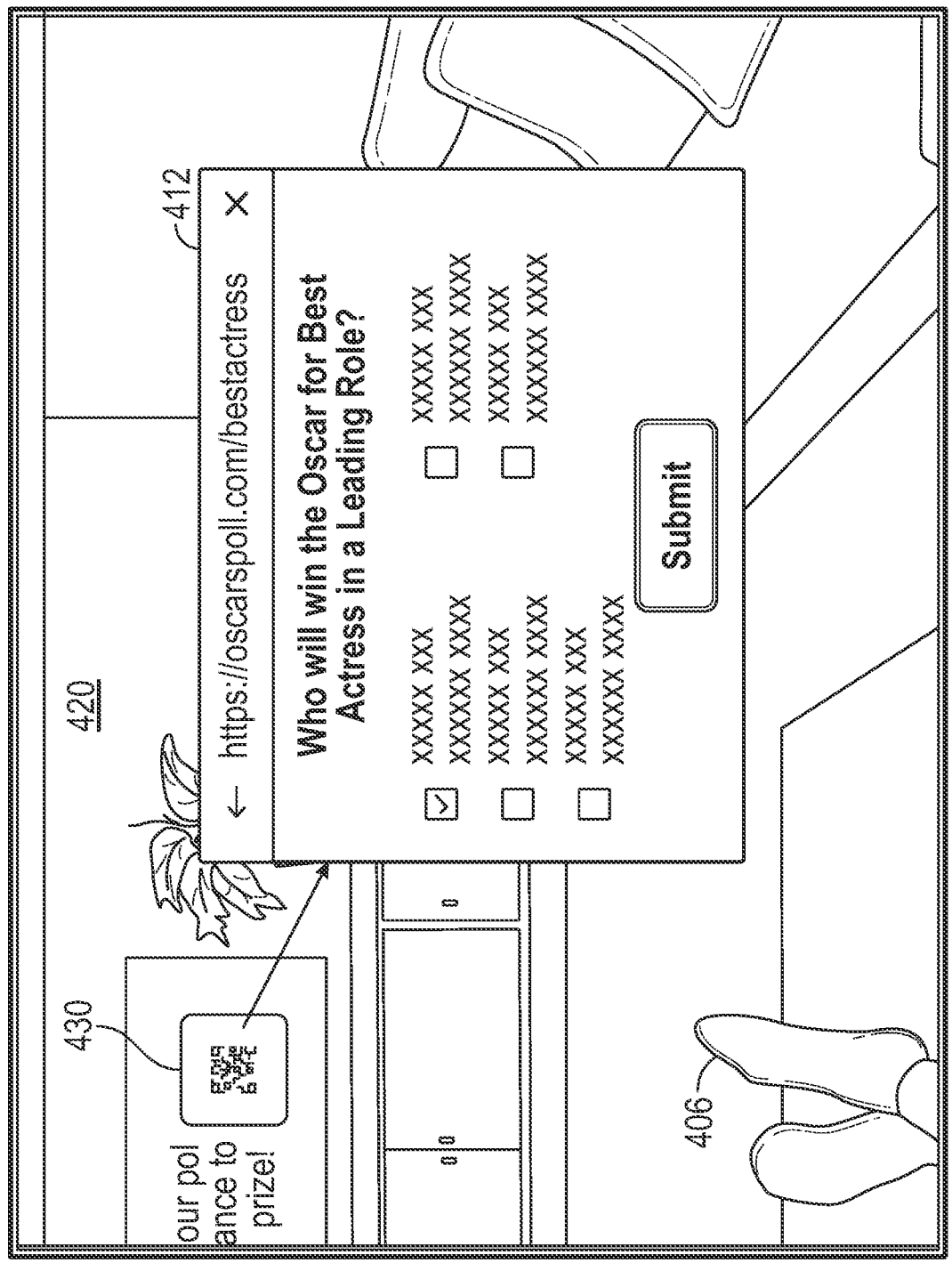

FIGS. 4A and 4B illustrate views 400 of a display of a headset running a mixed reality application, in accordance with one or more implementations.

In FIG. 4A, a user 406 is wearing a headset. The user 406 can view the physical reality 420 in see-through mode from the headset. As shown in FIG. 4A, the physical reality 420 may include a screen display wherein the user may be watching some real-time broadcast, or downstream, that includes a code 410 (e.g., a QR code). In some embodiments, the code may be labeled on any item in the physical reality. As described, the headset may include a camera. In some implementations, the camera may be on stand-by mode. The camera may be activated and switched to active mode upon detecting the performance of a predetermined gesture by the user 406. In some implementations, the camera may switch to active mode automatically upon detecting a code within the FOV 408 of the camera (or the user). In some implementations, the user may turn the camera on when perceiving the QR code in their FOV.

The headset may be configured to detect that a QR code 410 is in the FOV 408. The camera may be configured to capture the QR code and search for a website, link, or other information linked therein. In the example of FIG. 4A, in augmented reality mode, the headset display shows a message 412 (similar to a pop-up) to the user 406 indicating that a website has been found and requesting the user to select to access the website (via "open"). The user may choose not to select access and exit out of the message (via "x" symbol).

In FIG. 4B illustrates another example of a code 430 on a screen display wherein the user may be watching some real-time broadcast, or downstream. Upon detecting and scanning the code 430, the headset, in augmented reality mode, displays a message 412 including a prompt and menu on the headset display. The user 406 may select any of the options in the menu using, but not limited to, a gesture, an action performed on a secondary device (e.g., controllers 270a-270b) or at the headset, an audio command, or the like. The gesture may be directing a gaze onto the selection and blinking the eyes (e.g., gestures captured by an inward camera in the headset), or hand/finger gestures displayed on the headset camera or provided to the headset via a wristband device worn by the user.

Figure 5B:
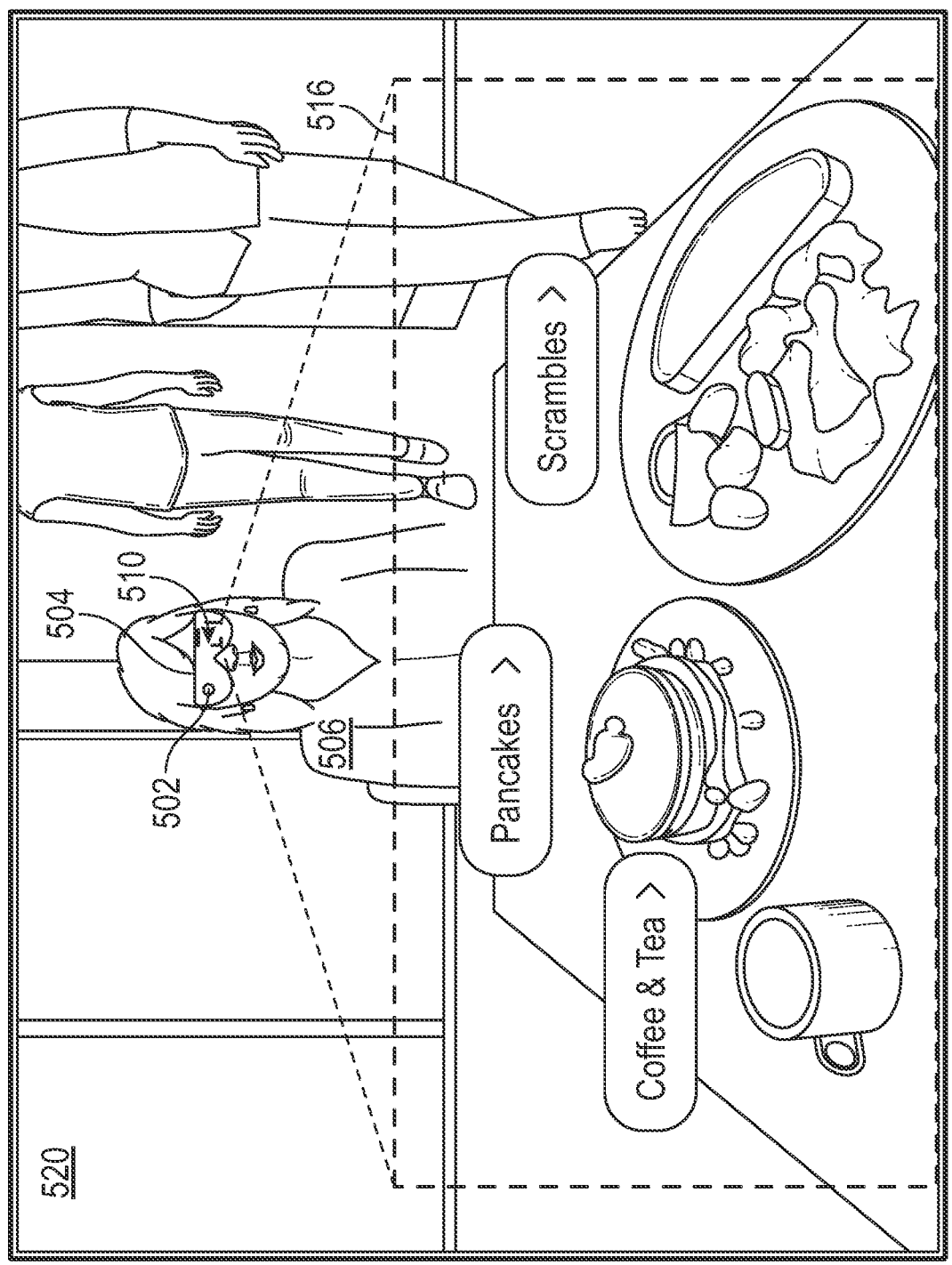

FIGS. 5A and 5B illustrates mixed reality views of a user using a smart glass (or headset), wherein the smart glass imports 3D objects into an immersed reality application upon reading a QR code in the field of view of a user, according to some embodiments.

In FIGS. 5A and 5B, the user 506 is sitting at a table in a restaurant. The physical reality 520 may include the table which is labeled with a QR code 508 and the user's general (physical reality) environment. The camera 502 in the headset 504 is turned on, for example, when the QR code 508 is identified on the table. The camera captures 512 the QR code and scans it. The headset display 510 shows, in augmented reality mode, a message 514 to the user (similar to a pop-up or the like), requesting access to a network site associated with the restaurant and menu options therein. The user 506 may select to access the menu (via "open"). The user may choose not to access the menu and exit out of the message 514 (via "x" symbol). In some implementations, the message 514 appears to be overlayed on the table. In some implementations, the message 514 is pinned to the table so as not to move when the headset moves or the user's FOV changes (e.g., the user looks around the restaurant).

FIG. 5B illustrates a mixed reality view when the user selects to open the menu. The headset display 510 shows, in augmented reality, menu items 516 imported as 3D objects that the user can manipulate, move around, and inspect as if the items were actually on the table for display. The 3D objects may be true to size. For example, the portion sizes on the plates (i.e., the 3D objects) may correspond to what the user may expect from ordering each of the plates. The menu may display an initial list of items divided by category (e.g., Coffee and Tea, Pancakes, and Scrambles), similar to an actual menu. Upon making an initial selection, the user may further explore each category and visualize 3D entities within each category that the user can further interact with.

According to embodiments, user interactions may include a combination of wristband signals indicative of hand/finger gestures, and/or camera capture of the user's hands within the FOV. The user may interact with the 3D objects in the immersive application by displaying hand gestures in front of the headset so that the camera may capture and interpret them, or haptic and motion sensors in a wristband device may identify hand/finger gestures made by the user and transmit them to the headset. For example, the user may perform a hand operation similar to selecting the item on the table (as if the item were sitting on the table) to indicate a selection to the headset. In some implementations, the user's selection may be communicated to a secondary device (e.g., a mobile device) wherein the user can complete, for example, a transaction or submit an order. These interactions may provide a more immersive and engaging experience for the user, enhancing the user's satisfaction with the artificial reality system and the standard QR code scanning experience.

Embodiments are not intended to be limited by these implementations. The AR scanning and interactive displays may be used in, by non-limiting example, vote casting wherein 3D renditions corresponding to the voting options are displayed in an AR application.

Figure 6:
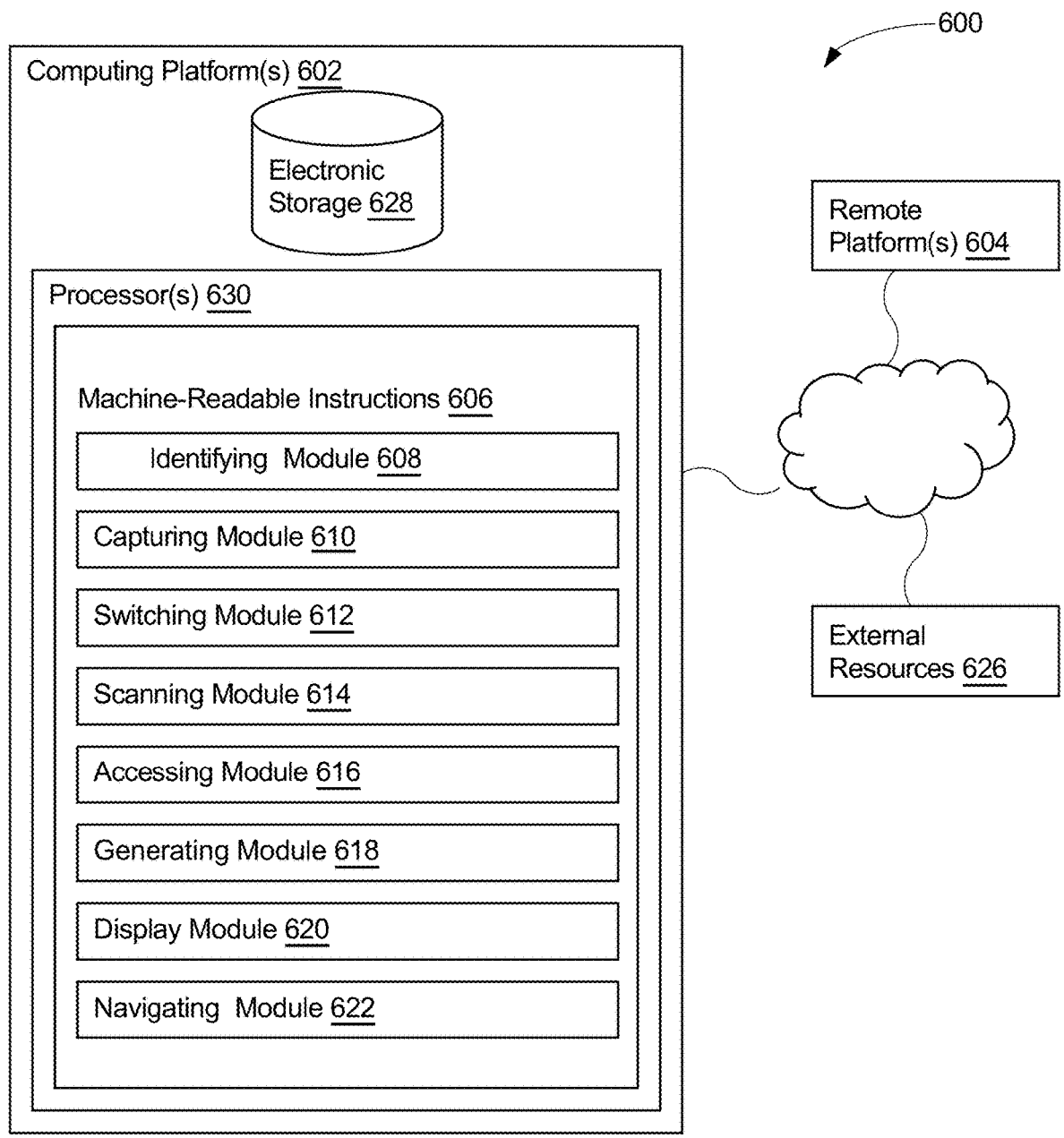
FIG. 6 illustrates a system configured for scanning codes and enabling virtual object interactions in AR applications based on the codes, in accordance with one or more implementations.

FIG. 6 illustrates a system 600 configured for virtual object interactions based on code scanning, according to certain aspects of the disclosure. In some implementations, system 600 may include one or more computing platforms 602. Computing platform(s) 602 may be configured to communicate with one or more remote platforms 604 according to a client/server architecture, a peer-to-peer architecture, and/or other architectures. Remote platform(s) 604 may be configured to communicate with other remote platforms via computing platform(s) 602 and/or according to a client/server architecture, a peer-to-peer architecture, and/or other architectures. Users may access system 600 via remote platform(s) 604.

Computing platform(s) 602 may be configured by machine-readable instructions 606. Machine-readable instructions 606 may include one or more instruction modules. The instruction modules may include computer program modules. The instruction modules may include one or more of identifying module 608, capturing module 610, switching module 612, scanning module 614, accessing module 616, generating module 618, display module 620, navigating module 622, and/or other instruction modules.

Identifying module 608 may be configured to identify, at a first device, a code (e.g., a QR code) in a FOV of a user. The code may be printed on an object in the physical reality.

Capturing module 610 may be configured to capture the code. In some implementations, the first device may be an AR headset or smart glass including a camera comprising the capturing module 610. In some implementations, the identifying module 608 is configured to identify the code in the FOV of the camera included in the AR headset of the user and the capturing module 610 proceeds to capture the code.

Switching module 612 may be configured to switch a mode of the camera in the first device. For example, a presence of the code (identified through the identifying module 608) may trigger activation of the camera when the camera is, for example, in stand-by mode. As such, the switching module 612 is configured to switch the mode of the camera from stand-by mode to active mode. In some embodiments, the capturing module 610 may detect at least one of a predetermined gesture from the user or a presence of the code within the FOV of the user. In response to the capturing module 610, the switching module 612 may switch a mode of the camera. In some implementations, the switching module 612 may be configured to switch the camera from active mode to stand-by mode after a predetermined period of time has passed without code detection. In some implementations, the switching module 612 is configured to switch to (or maintain) stand-by mode if the user is determined to be interacting with other objects (in the physical reality or virtual reality).

Scanning module 614 may be configured to scan the code. For example, the camera may capture the code and scan the code for information linked therein. In some implementations, the scanning is performed based on a status of the camera. By way of non-limiting example, the camera may automatically scan the code when the camera is in active mode.

In some embodiments, the system 600 is configured train a machine learning (ML) model, on user data. The ML model may learn, for example, based on user behavior, when to automatically scan and display content to the user. By way of non-limiting example, when a user enters a restaurant, the ML model may learn that users will likely want to view the menu, and as such, automatically scan the code when the code is within FOV of the user. In some implementations, the system 600 may first display a message (e.g., "Would you like to view the menu?"). The user may interact with the message and confirm next steps (e.g., "No, I do not want to view the menu" or "Yes, let's see the menu").

Accessing module 616 may be configured to access a network site associated with the object based on the code scanning. By way of non-limiting example, the network site may direct to a link, URL, or the like. In some embodiments, the accessing module 616 is configured to request access to a server. Upon approval of the request, the accessing module 616 may retrieve information/resources at the server which are specified by the code. According to some embodiments, the accessing module 616 may be further configured to retrieve at least one virtual object from the network site.

Generating module 618 may be configured to generate virtual content based on the information/resources retrieved from the network site. The virtual content may include at least one virtual object. In some embodiments, the generating module 618 may be further configured to retrieve and load a 3D virtual object or model.

Display module 620 may be configured to display the virtual content in the first device. For example, the virtual content may be displayed through a display of an AR headset via an AR application. In some implementations, the display module 620 may display the 3D virtual object/model at a display of the first device. In some implementations, the display may include a combination of the FOV of the user and the 3D virtual object displayed in the AR application of the AR headset.

Navigating module 622 may be configured to navigating the virtual content in response to a gesture from the user. The navigating module 622 may be further configured to receive and interpret gestures from the user. The gestures may be used to navigating, manipulate, and interact with one or more objects included in the virtual content. By way of non-limiting example, the user can interact with a 3D virtual object via the AR application of the AR headset. In some embodiments, the navigating module 622 is configured to receive, from a second device, a signal identifying the gesture from the user indicative of a navigation command. The second device may be an external device communicatively coupled with the first device including, but not limited to, a wristband device, a controller, or other wearable device including haptic sensors or the like.

According to some embodiments, the gesture may be captured by the capturing module 610. In some implementations, the gesture may be a hand gesture of the user. In some implementations, the gesture may be a voice command from the user via a microphone included in the first device.

In some implementations, computing platform(s) 602, remote platform(s) 604, and/or external resources 626 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 602, remote platform(s) 604, and/or external resources 626 may be operatively linked via some other communication media.

A given remote platform 604 may include one or more processors configured to execute computer program modules. The computer program modules may be configured to enable an expert or user associated with the given remote platform 604 to interface with system 600 and/or external resources 626, and/or provide other functionality attributed herein to remote platform(s) 604. By way of non-limiting example, a given remote platform 604 and/or a given computing platform 602 may include one or more of a server, a desktop computer, a laptop computer, a handheld computer, a tablet computing platform, a NetBook, a Smartphone, a gaming console, and/or other computing platforms.

External resources 626 may include sources of information outside of system 600, external entities participating with system 600, and/or other resources. In some implementations, some or all of the functionality attributed herein to external resources 626 may be provided by resources included in system 600.

Computing platform(s) 602 may include electronic storage 628, one or more processors 630, and/or other components. Computing platform(s) 602 may include communication lines, or ports to enable the exchange of information with a network and/or other computing platforms. Illustration of computing platform(s) 602 in FIG. 6 is not intended to be limiting. Computing platform(s) 602 may include a plurality of hardware, software, and/or firmware components operating together to provide the functionality attributed herein to computing platform(s) 602. For example, computing platform(s) 602 may be implemented by a cloud of computing platforms operating together as computing platform(s) 602.

Electronic storage 628 may comprise non-transitory storage media that electronically stores information. The electronic storage media of electronic storage 628 may include one or both of system storage that is provided integrally (i.e., substantially non-removable) with computing platform(s) 602 and/or removable storage that is removably connectable to computing platform(s) 602 via, for example, a port (e.g., a USB port, a firewire port, etc.) or a drive (e.g., a disk drive, etc.). Electronic storage 628 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 628 may include one or more virtual storage resources (e.g., cloud storage, a virtual private network, and/or other virtual storage resources). Electronic storage 628 may store software algorithms, information determined by processor(s) 630, information received from computing platform(s) 602, information received from remote platform(s) 604, and/or other information that enables computing platform(s) 602 to function as described herein.

Processor(s) 630 may be configured to provide information processing capabilities in computing platform(s) 602. As such, processor(s) 630 may include one or more of a digital processor, an analog processor, a digital circuit designed to process information, an analog circuit designed to process information, a state machine, and/or other mechanisms for electronically processing information. Although processor(s) 630 is shown in FIG. 6 as a single entity, this is for illustrative purposes only. In some implementations, processor(s) 630 may include a plurality of processing units. These processing units may be physically located within the same device, or processor(s) 630 may represent processing functionality of a plurality of devices operating in coordination. Processor(s) 630 may be configured to execute modules 608, 610, 612, 614, 616, 618, 620, and/or 622, and/or other modules. Processor(s) 630 may be configured to execute modules 608, 610, 612, 614, 616, 618, 620, and/or 622, and/or other modules by software; hardware; firmware; some combination of software, hardware, and/or firmware; and/or other mechanisms for configuring processing capabilities on processor(s) 630. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 608, 610, 612, 614, 616, 618, 620, and/or 622 are illustrated in FIG. 6 as being implemented within a single processing unit, in implementations in which processor(s) 630 includes multiple processing units, one or more of modules 608, 610, 612, 614, 616, 618, 620, and/or 622 may be implemented remotely from the other modules. The description of the functionality provided by the different modules 608, 610, 612, 614, 616, 618, 620, and/or 622 described below is for illustrative purposes, and is not intended to be limiting, as any of modules 608, 610, 612, 614, 616, 618, 620, and/or 622 may provide more or less functionality than is described. For example, one or more of modules 608, 610, 612, 614, 616, 618, 620, and/or 622 may be eliminated, and some or all of its functionality may be provided by other ones of modules 608, 610, 612, 614, 616, 618, 620, and/or 622. As another example, processor(s) 630 may be configured to execute one or more additional modules that may perform some or all of the functionality attributed below to one of modules 608, 610, 612, 614, 616, 618, 620, and/or 622.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 7:
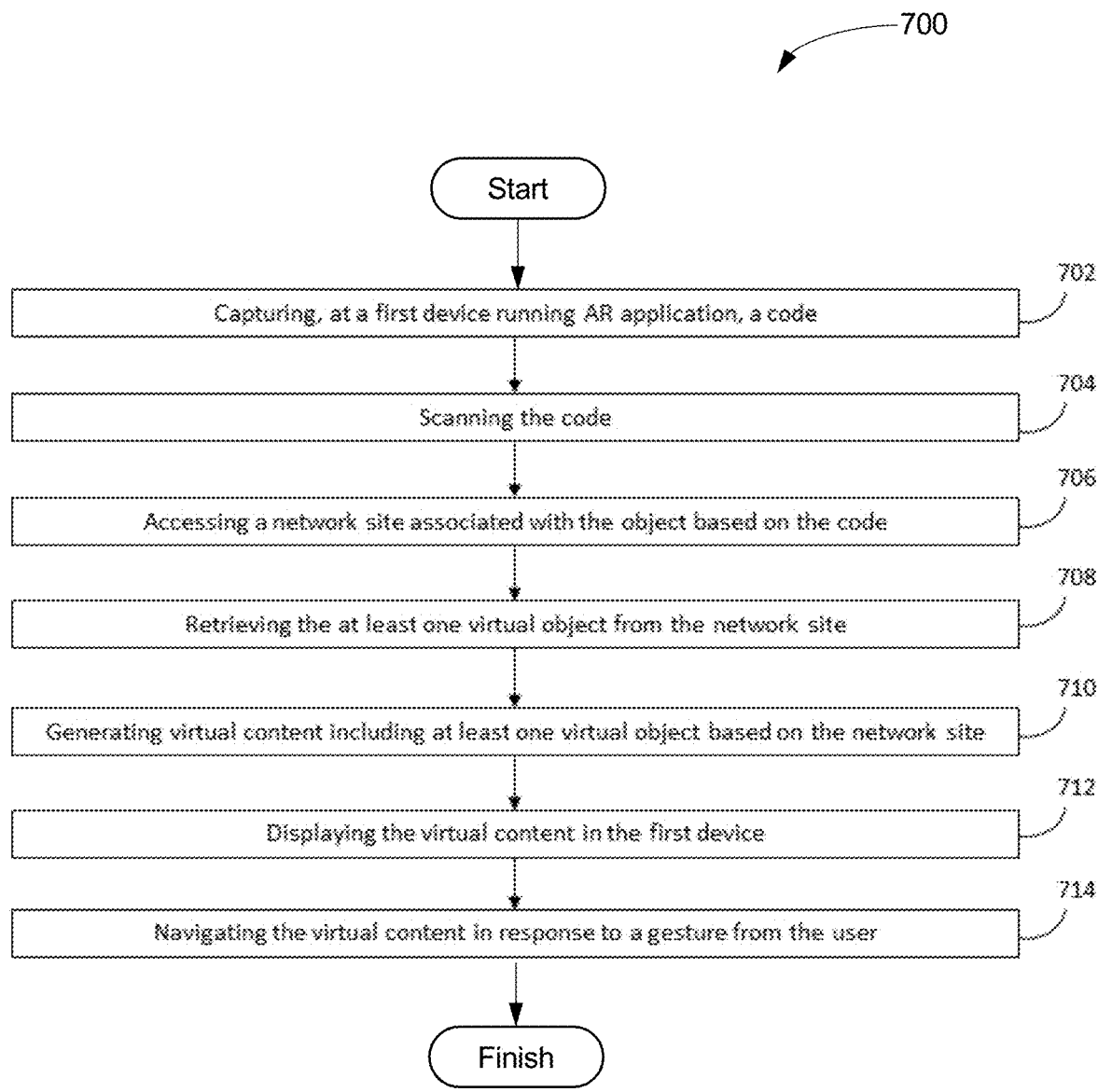
FIG. 7 illustrates an example flow diagram for sharing virtual objects, according to certain aspects of the disclosure.

FIG. 7 illustrates an example flow diagram (e.g., process 700) for virtual object interactions based on code scanning, according to certain aspects of the disclosure. For explanatory purposes, the example process 700 is described herein with reference to FIGS. 1-6. Further for explanatory purposes, the steps of the example process 700 are described herein as occurring in serial, or linearly. However, multiple instances of the example process 700 may occur in parallel. For purposes of explanation of the subject technology, the process 700 will be discussed in reference to FIGS. 1-6.

At step 702, the process 700 may include capturing, at a first device running AR application, a code. The code may be, for example, a QR code. The code may be printed on an object in the physical reality within a FOV of a user of the first device. At step 704, the process 700 may include scanning the code. A camera included in the first device may scan the code. At step 706, the process 700 may include accessing a network site associated with the object based on the code. At step 708, the process 700 may include retrieving at least one virtual object from the network site. At step 710, the process 700 may include generating virtual content including the at least one virtual object based on the network site. At step 712, the process 700 may include displaying the virtual content in the first device. At step 714, the process 700 may include navigating the virtual content in response to a gesture from the user and interact with the virtual content at the first device.

For example, as described above in relation to FIG. 6, at step 702, the process 700 may include capturing, at a first device running AR application, a code, through capturing module 610. At step 704, the process 700 may include scanning the code, through scanning module 614. At step 706, the process 700 may include accessing a network site associated with the object based on the code, through accessing module 616. At step 708, the process 700 may include retrieving at least one virtual object from the network site, through accessing module 616. At step 710, the process 700 may include generating virtual content including the at least one virtual object based on the network site, through generating module 618. At step 712, the process 700 may include displaying the virtual content in the first device, through display module 620. At step 714, the process 700 may include navigating the virtual content in response to a gesture from the user, through navigating module 622.

According to an aspect, the first device is at least one of a headset and a smart glass. The first device may include a camera. The camera may, by non-limiting example, scan the code and capture the gesture from the user indicating a navigation command.

According to an aspect, the process 700 may include loading a virtual three-dimensional (3D) object based on the network site, and displaying, within an AR application in the first device, a combination of the FOV of the user and the virtual 3D object, wherein the user interacts with the virtual 3D object via the AR application.

According to an aspect, the 3D object is viewed and interacted with in an AR environment that includes both virtual objects and real objects.

According to an aspect, the process 700 may include receiving, from a second device, a signal identifying the gesture from the user indicative of a navigation command.

According to an aspect, the gesture is a hand gesture of the user.

According to an aspect, the process 700 may include receiving a voice command from the user via a microphone included in the first device, wherein the gesture is the voice command from the user.

According to an aspect, the process 700 may include detecting at least one of (i) a predetermined gesture from the user, and (ii) a presence of the QR code within the FOV of the user; and switching a camera in the first device from stand-by mode to active mode, wherein the scanning of the QR code is automatically performed when the camera is in the active mode.

According to an aspect, the process 700 may include displaying a message including a link, wherein the user may select the link to proceed with interacting with the information from the network site.

Hardware Overview

Figure 8:
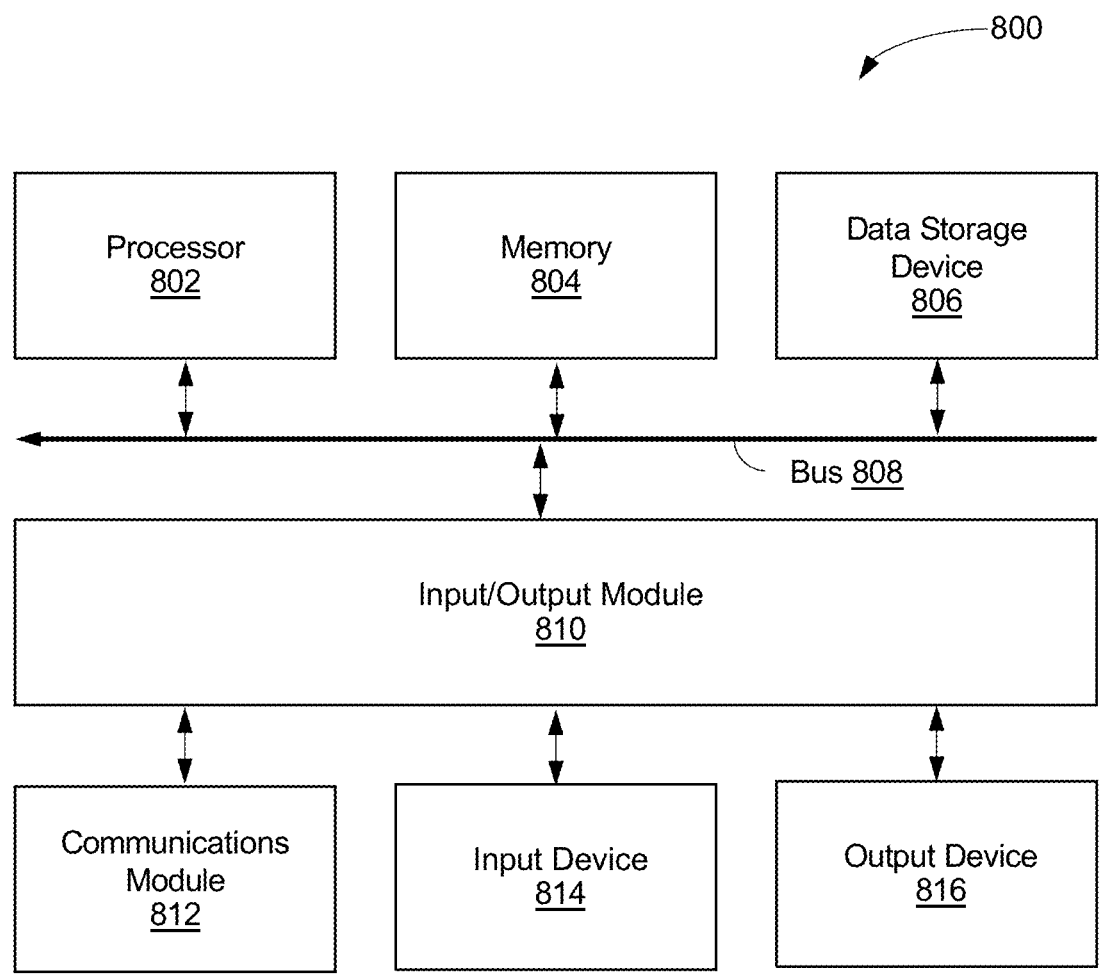
FIG. 8 is a block diagram illustrating an example computer system (e.g., representing both client and server) with which aspects of the subject technology can be implemented.

FIG. 8 is a block diagram illustrating an exemplary computer system 800 with which the client and server of FIGS. 1 and 3, and method(s) described herein can be implemented. In certain aspects, the computer system 800 may be implemented using hardware or a combination of software and hardware, either in a dedicated server, or integrated into another entity, or distributed across multiple entities. Computer system 800 may include a desktop computer, a laptop computer, a tablet, a phablet, a smartphone, a feature phone, a server computer, or otherwise. A server computer may be located remotely in a data center or be stored locally.

Computer system 800 (e.g., mobile device 304 and server 360) includes a bus 808 or other communication mechanism for communicating information, and a processor 802 (e.g., processors 212) coupled with bus 808 for processing information. By way of example, the computer system 800 may be implemented with one or more processors 802. Processor 802 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 800 can include, in addition to hardware, code that creates an execution environment for the computer program in question, e.g., code that constitutes processor firmware, a protocol stack, a database management system, an operating system, or a combination of one or more of them stored in an included memory 804 (e.g., memory circuit 218), such as a Random Access Memory (RAM), a Flash Memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. The processor 802 and the memory 804 can be supplemented by, or incorporated in, special purpose logic circuitry.

The instructions may be stored in the memory 804 and implemented in one or more computer program products, e.g., one or more modules of computer program instructions encoded on a computer-readable medium for execution by, or to control the operation of, the computer system 800, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 804 may also be used for storing temporary variable or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 800 further includes a data storage device 806 such as a magnetic disk or optical disk, coupled to bus 808 for storing information and instructions. Computer system 800 may be coupled via input/output module 810 to various devices. Input/output module 810 can be any input/output module. Exemplary input/output modules 810 include data ports such as USB ports. The input/output module 810 is configured to connect to a communications module 812. Exemplary communications modules 812 (e.g., communications module 224) include networking interface cards, such as Ethernet cards and modems. In certain aspects, input/output module 810 is configured to connect to a plurality of devices, such as an input device 814 and/or an output device 816. Exemplary input devices 814 include a keyboard and a pointing device, e.g., a mouse or a trackball, by which a user can provide input to the computer system 800. Other kinds of input devices 814 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 816 include display devices, such as an LCD (liquid crystal display) monitor, for displaying information to the user.

According to one aspect of the present disclosure, the client device and server can be implemented using a computer system 800 in response to processor 802 executing one or more sequences of one or more instructions contained in memory 804. Such instructions may be read into memory 804 from another machine-readable medium, such as data storage device 806. Execution of the sequences of instructions contained in main memory 804 causes processor 802 to perform the process steps described herein. One or more processors in a multi-processing arrangement may also be employed to execute the sequences of instructions contained in memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following tool topologies, including a bus network, a star network, a ring network, a mesh network, a star-bus network, tree or hierarchical network, or the like. The communications modules can be, for example, modems or Ethernet cards.

Computer system 800 can include clients and servers. A client and server are generally remote from each other and typically interact through a communication network. The relationship of client and server arises by virtue of computer programs running on the respective computers and having a client-server relationship to each other. Computer system 800 can be, for example, and without limitation, a desktop computer, laptop computer, or tablet computer. Computer system 800 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 802 for execution. Such a medium may take many forms, including, but not limited to, non-volatile media, volatile media, and transmission media. Non-volatile media include, for example, optical or magnetic disks, such as data storage device 806. Volatile media include dynamic memory, such as memory 804. Transmission media include coaxial cables, copper wire, and fiber optics, including the wires forming bus 808. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, performed by at least one processor, the method comprising:
in response to detecting (i) a predetermined gesture performed by a user of a head-worn device and (ii) a presence of a quick-response (QR) code within a field of view (FOV) of the user:
switching a camera of the head-worn device from a stand-by mode to an active mode; and
capturing, via the camera of the head-worn device, image data of the FOV of the user, the image data including the QR code;
displaying virtual content based on the QR code to the user at the head-worn device; and
updating the virtual content in response to a navigation command performed by the user.

2. The computer-implemented method of claim 1, wherein:
the QR code includes a link to a network site; and
the virtual content is retrieved from the network site.

3. The computer-implemented method of claim 1, wherein:
the virtual content includes a virtual three-dimensional (3D) object based on the QR code; and
displaying the virtual content includes displaying a combination of the FOV of the user and the virtual 3D object.

4. The computer-implemented method of claim 1, further comprising:
before updating the virtual content, receiving, from a second device, a signal identifying a gesture performed by the user, the gesture indicating the navigation command.

5. The computer-implemented method of claim 1, further comprising:
before updating the virtual content, capturing, with the camera of the head-worn device, a gesture performed by the user, the gesture indicating the navigation command.

6. The computer-implemented method of claim 5, wherein the gesture is a hand gesture.

7. The computer-implemented method of claim 1, further comprising:
before updating the virtual content, receiving a voice command performed by the user via a microphone of the head-worn device, the voice command indicating the navigation command.

8. The computer-implemented method of claim 1, further comprising:
in response to detecting (i) another predetermined gesture performed by the user and (ii) a presence of another QR code within the FOV of the user:
switching the camera of the head-worn device from the stand-by mode to the active mode; and
capturing, via the camera of the head-worn device, other image data of the FOV of the user, the other image data including the other QR code;
displaying other virtual content based on the other QR code to the user at the head-worn device; and
updating the other virtual content in response to another navigation command performed by the user.

9. The computer-implemented method of claim 1, further comprising:
in response to detecting one or more other gestures performed by the user:
in accordance with a determination that the one or more other gestures are directed at one or more objects not associated with the QR code, forgoing switching the camera of the head-worn device from the stand-by mode to the active mode.

10. A system comprising:
one or more processors; and
a memory storing instructions which, when executed by the one or more processors, cause the system to:
in response to detecting (i) a predetermined gesture performed by a user of a head-worn device and (ii) a presence of a quick-response (QR) code within a field of view FOV) of the user:
switch a camera of the head-worn device from a stand-by mode to an active mode; and
capture, via the camera of the head-worn device, image data of the FOV of the user, the image data including the QR code;
display virtual content based on the QR code to the user at the head-worn device; and
update the virtual content in response to a navigation command performed by the user.

11. The system of claim 10, wherein:
the QR code includes a link to a network site; and
the virtual content is retrieved from the network site.

12. The system of claim 10, wherein:
the virtual content includes a virtual three-dimensional (3D) object based on the QR code; and
displaying the virtual content includes displaying a combination of the FOV of the camera and the virtual 3D object.

13. The system of claim 10, wherein the instructions further cause the system to:
before updating the virtual content, receive, from a second device, a signal identifying a gesture performed by the user, the gesture indicating the navigation command.

14. The system of claim 10, wherein the instructions further cause the system to:
before updating the virtual content, capture, with the camera of the head-worn device, a gesture performed by the user, the gesture indicating the navigation command.

15. The system of claim 14, wherein the gesture is a hand gesture of the user.

16. The system of claim 10, wherein the instructions further cause the system to:
before updating the virtual content, receive a voice command performed by the user via a microphone of the head-worn device, the voice command indicating the navigation command.

17. The system of claim 10, wherein the instructions further cause the system to:
in response to detecting one or more other gestures performed by the user:
in accordance with a determination that the one or more other gestures are directed at one or more objects not associated with the QR code, forgo switching the camera of the head-worn device from the stand-by mode to the active mode.

18. A non-transitory computer-readable storage medium having instructions embodied thereon, the instructions, when executed by one or more processors, cause the one or more processors to:
   in response to detecting (i) a predetermined gesture performed by a user of a head-worn device and (ii) a presence of a quick-response (QR) code within a field of view (FOV) of the user:
      cause a camera of the head-worn device to switch from a stand-by mode to an active mode; and
      cause the camera of the head-worn device to capture image data of the FOV of the user, the image data including the QR code
   cause the head-worn device to display, to the user, virtual content based on the QR code; and
   cause the virtual content to be updated in response to a navigation command performed by the user.

19. The non-transitory computer-readable storage medium of claim 18, wherein:
   the virtual content includes a virtual three-dimensional (3D) object based on the QR code; and
   causing the head-worn device to display the virtual content includes causing the head-worn device to display a combination of the FOV of the user and the virtual 3D object.

20. The non-transitory computer-readable storage medium of claim 18, wherein the instructions further cause the one or more processors to:
   before causing the virtual content to be updated, obtain from a second device, a signal identifying a gesture performed by the user, the gesture indicating the navigation command.

\* \* \* \* \*